Nov. 29, 1960   J. A. GARMAN   2,962,300
TRACTOR TANDEM HITCH
Filed April 6, 1959

JAMES A. GARMAN
*INVENTOR.*
BY *P. R. Kimpel*
ATTORNEY

# United States Patent Office 2,962,300
Patented Nov. 29, 1960

2,962,300
TRACTOR TANDEM HITCH
James A. Garman, 704 Hildale St., Washington, Ill.

Filed Apr. 6, 1959, Ser. No. 804,216

1 Claim. (Cl. 280—400)

This invention relates generally to a tractor linkage apparatus and more particularly to a tandem linkage apparatus for connecting two tractors, one behind the other, in such a manner that the combined power of both tractors can be utilized in drawing tractor-drawn farm implements. Many farms require the use of a relatively high-powered tractor only infrequently, relying primarily on smaller tractors. On some occasions, however, it is a decided advantage to have the high horsepower available which is normally found only in the larger machines. The tractor hitch of this invention enables a farmer to combine two small tractors, and thereby achieve the performance of a large tractor. Tractor hitches now in use have the disadvantage that they use the gear box and frames of the two tractors being connected as integral parts of the connecting apparatus. In operation, such hitches impose severe stresses and bending moments on the gear box and frames of the tractors involved.

It is an object of this invention to provide an improved tractor tandem hitch which, in operation, absorbs and resists the stresses and bending moments exerted between two inter-connected tractors without transmitting these forces to the gear box, frame, and engine block of either of the tractors, thereby avoiding distortion of these parts of the tractors.

A further object of this invention is provide a tractor tandem hitch which is rugged in construction, able to withstand heavy use, but which is also maneuverable when applied to tractors, and thus versatile in use.

Another object of this invention is to provide a hitch which is simple, economical, and efficient which can be attached to two tractors without the use of special tools, nor without requiring special skill.

Further objects, features, and advantages of this invention will become apparent upon a consideration of the following description taken in conjunction with the accompanying drawings in which.

Figure 1:
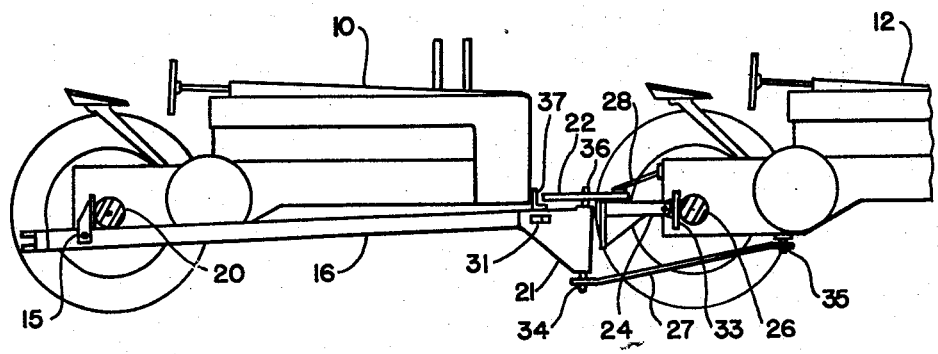
Figure 1 is a side elevational view showing the tandem hitch construction embodying the principles of this invention connecting two tractors.
Figure 2:
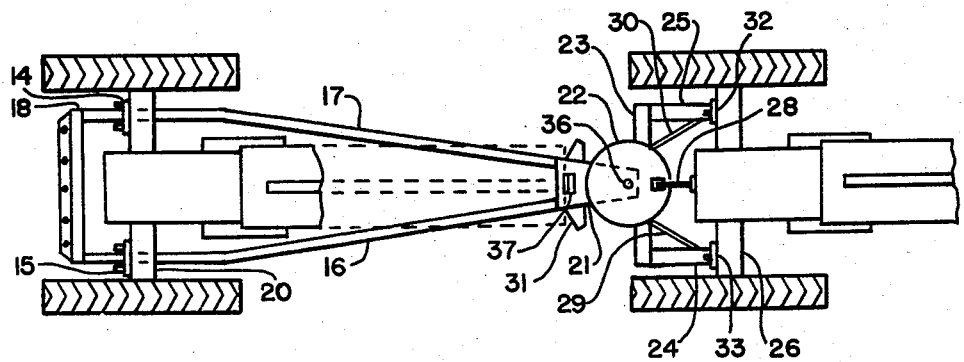
Figure 2 is a plan view of the hitch interconnecting two tractors with some parts of the tractors not shown, and with some portions of the tractors shown in dotted lines to more clearly reveal the nature of the invention.

Referring now more particularly to Figures 1 and 2 of the drawings, there are shown two tractors indicated generally at 10 and 12 which are interconnected by the tandem hitch, the hitch being comprised of a rigid, triangularly-shaped rear frame formed generally by side rails 16 and 17 and rear cross-bar 18, and a front frame formed by side bars 24 and 25, cross-support 23, sheave 22, horizontal brace bars 29 and 30, and vertical brace bar 28. When the two tractors are used with this invention, the front wheels are removed from both tractors. The rear frame is attached to rear axle of the rear tractor by brackets 14 and 15, by inserting pins through aligned apertures in the brackets and the side rails 16 and 17. The brackets are attached to the axle of the tractor by U bolts or other suitable means. The rear frame is further connected to the rear tractor at a third point at the front of the tractor by a bracket 37 which is bolted to the tractor and the frame. This three point attachment provides a rigid connection between the tractor and the frame, but prevents any torsional stresses or bending moments from being applied to the gear box or engine block of the rear tractor.

The front frame is rigidly attached to the front tractor by brackets 32 and 33 which serve to connect side bars 24 and 25 to the rear axle of the front tractor. This rear axle is denoted at 26. The brackets 32 and 33 are connected to the rear axle 26 by U bolts or other suitable means. The front frame is further connected to the front tractor by a rigid, vertical, brace bar 28 which is bolted to both the tractor and the sheave 22. The sheave 22 is affixed rigidly to the cross-support 23 of the front frame. The sheave is a part of the steering apparatus, as well as being a part of the connecting mechanism for the front and rear frame. The steering apparatus is not shown in its entirety as it is not part of this invention, but briefly, the steering is accomplished by means of a cable which encircles the sheave and has its ends attached to hydraulic cylinders which are in turn affixed to the rear frame of the hitch.

A pivot support 21 is attached at the forward ends of the side rails 16 and 17 and incorporates a pivot shaft which is immovably mounted in said pivot support, and terminates at its upper end at 36 and at its lower end at 34. The upper end 36 of the pivot shaft pivotally engages an aperture in the center of the sheave 22 and the bearing at this point, being in the nature of a ball-and-socket bearing, allows rotation about the vertical axis of the pivot shaft, and rotation about the longitudinal axis of the tractors. The lower end 34 of the pivot shaft pivotally engages one end of connecting link 27, the other end of the connecting link being pivotally attached to the frame of the front tractor at 35. The bearing at 34 allows rotation in the same planes as does the bearing at 36, but the bearing at 35 allows rotation only in a plane parallel to the ground on which the units are traveling. The result of these bearing arrangements is that the two tractors can roll with respect to each other, each rotating independently of the other on the common longitudinal axis of both tractors. This occurs when the connected units are operated on unlevel terrain.

The described construction of the hitch results in the rear frame supporting the front end of the front tractor, allowing removal of the front wheels of the front tractor and placing the entire weight of the front tractor on its rear wheels, improving the traction obtained therefrom. This also results in the connecting link 27 being placed in compression, and it is therefore designed to resist compressive forces.

A turn restrictor 31 is mounted on the front portion of the rear frame, and operates to prevent too sharp turns from being made. The extremities of turn restricter 31 engage the rear face of cross support 23 to limit the radius of turn.

A preferred embodiment of the invention has been shown for purposes of illustration, but it is understood that various changes and modifications can be made therein without departing from the scope of the invention.

I claim:

A tractor tandem hitch comprising a triangularly shaped rear frame, a front frame, and pivot shaft means pivotally connecting said rear frame and said front frame, said rear frame comprising a draw bar, a left side rail, and a right side rail, said side rails extending forwardly from the extremities of said draw bar and joining together at their forward extremities, said front frame comprising a cross support, a left side bar and a right side bar extending forwardly from and rigidly connected to the ends of said cross support and substantially parallel to each other, said pivot shaft means comprising a pivot support rigidly attached to the forward ends of said left and right side rails, a pivot shaft fixedly mounted in said pivot support in a substantially vertical position, a sheave rigidly attached to said front frame, a connecting link, said pivot shaft pivotally engaging at its upper end said sheave, and at its lower end pivotally engaging one end of said connecting link, the other end of said connecting link pivotally engaging a frame of a forward tractor, the forward ends of said left and right side bars detachably connected to a rear axle of a forward tractor, and said left and right side rails detachably connected at their rearward portions to a rear axle of a rear tractor, and means connecting said pivot support to a front portion of a rear tractor.

References Cited in the file of this patent
UNITED STATES PATENTS 2,727,581    Wright _____ Dec. 20, 1955